Dec. 12, 1961    H. H. LERNER    3,012,886
EMULSION COATING AND METHOD OF PREPARATION
Filed Dec. 29, 1958

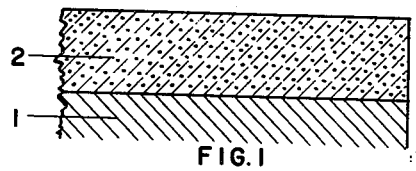

FIG. I — BICHROMATED GELATIN COATING. (DRY STATE)

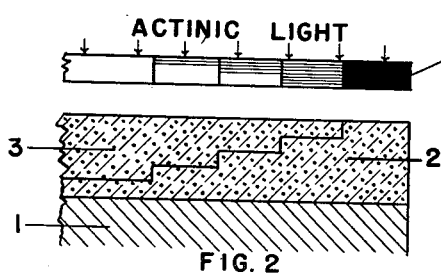

FIG. 2 — EXPOSED PLATE BEFORE BICHROMATE WASH-OUT (DRY STATE)

ACTINIC LIGHT / CONTINUOUS TONE NEGATIVE DENSITIES

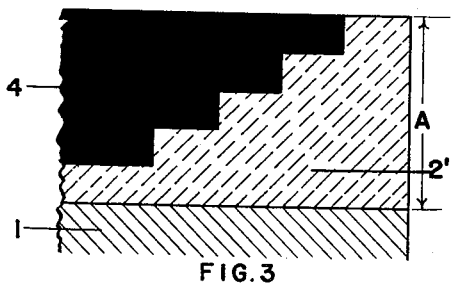

FIG. 3 — PLATE AFTER BICHROMATE WASH-OUT AND INKED (WET STATE)

(A) SHOWING MAXIMUM SWELLING OF LEAST TANNED AREAS

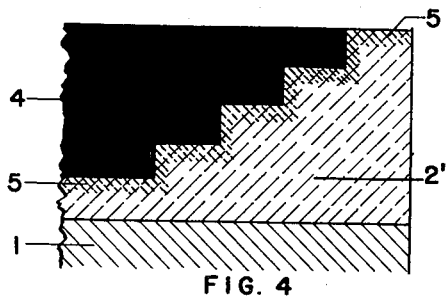

FIG. 4 — INKED PLATE AFTER SURFACE HARDENING

INVENTOR.
HARRY H LERNER
BY Fritz G. Hochwald

United States Patent Office 3,012,886
Patented Dec. 12, 1961

3,012,886
EMULSION COATING AND METHOD OF PREPARATION
Harry H. Lerner, 302 W. 12th St., New York, N.Y.
Filed Dec. 29, 1958, Ser. No. 783,289
6 Claims. (Cl. 96—33)

The invention relates to an improved surface coating useful in printing and to a method for making such coating.

Collotype printing, or as it is sometimes known, photogelatin printing, is the best example for utilizing the unique properties of this coating as it will be hereby set forth.

It is well known that the collotype process of printing gives the nearest approach to a truly continuous tone result of all the photomechanical printing methods. Nevertheless, collotype printing has steadily lost ground in competition with other photomechanical processes because the manufacture of the printing plates and the printing procedure could not be adapted to modern mass production. The preparation and the handling of the plates required a delicate balance of various conditions, which were mostly jealously guarded inherited secrets of individual craftsmen; but generally, collotype plates made even by highly skilled operators did not allow more than a very few thousand impressions being printed. It is for this reason that collotype could not be employed for large editions of highest quality printing for which collotype is famous. At present, therefore, it is generally used throughout the world for printing only small editions of fine reproductions and illustrations.

It is the principal object of this invention to provide a method of preparing an improved coating for such plates as well as plates for other methods of printing which can utilize the unusual properties of the new coating.

Other objects and advantages will become apparent from a consideration of the specification and claims.

The invention will be better understood by giving first a short description of the collotype process as practised heretofore and by pointing out its inherent shortcomings.

In collotype printing, a glass or metal plate is coated with a bichromated gelatin and dried under controlled conditions. It is then exposed to light in contact with a continuous-tone negative, washed with water to remove the excess of bichromate, and soaked in glycerine to keep the parts not hardened by the action of light in a moist and swollen condition. In printing, the tanned areas that received maximum exposure take a solid film of ink, whereas the less exposed parts must have taken up sufficient moisture to repel the ink. Intermediate areas take ink in proportion to the degree of exposure and print in intermediate hues.

In printing, the plates deteriorate rather quickly and lose the necessary contrast even under best moisture conditions because the unexposed areas of the printing surface have not sufficient mechanical strength and because in spite of the washing process bichromate has remained in the tanned exposed parts of the gelatin layer and continues to react with the gelatin during printing. As a result, the plates become increasingly brittle and the contrasts between highlights and shadows are flattened out so that at best, after a few thousand impressions, the plates become unsuitable for further use.

Similar conditions prevail in the continuous tone offset printing. Here the image is transferred from the plate to the rubber blanket to the paper. The same difficulties as recited above are encountered here, only multiplied by the fact that the printing speed is many times higher. For this reason, attempts to introduce continuous tone offset printing have been completely abandoned.

Gelatin, despite its comparatively poor mechanical strength, has the advantage of being an excellent reversible colloid with good swelling properties and good retention of water and plasticizer. Also, gelatin has the ability to undergo the light sensitization reaction forming the "just right" hydrophobic surface to accept ink, to retain its insolubility in cold water and maintain a high degree of plasticity and hydrophilic properties in highlights and middletones.

When considering the aforementioned drawback of gelatin, namely, poor mechanical strength, an obvious remedy seems to be to increase the mechanical strength of said surface by hardening. This is readily obtained by an increased exposure to light or by the treatment with a hardening agent, for instance formaldehyde. Unfortunately, these treatments are accompanied by side-effects which introduce a harmful modification of the printing plate or impair the desired high quality of the impressions. If the light induced tanning penetrates too deeply into the gelatin layer, the highly tanned cross-linked gelatin loses its resiliency, which results in brittleness in the shadows and loss of gradation. A highly elastic gel underneath the tough surface image is essential for good printing quality.

If a gelatin hardener has been employed, it has been impossible to limit the hardening action to the surface; the reaction proceeds until again the hydrophobic character of the gelatin is unduly increased, the gelatin layer becomes brittle, and the unexposed parts become too hard and take up some ink resulting in a dirty white in the highlights of the picture.

In the course of my investigations, I have found a way to produce a coating emulsion which combines the desired mechanical strength of the surface with the desired elasticity of the under layer and maintains printing qualities without deterioration for runs of many thousand prints.

This result is obtained by using gelatin coatings which contain predetermined amounts of a water-soluble dialdehyde or ketoaldehyde, or mixture of such compounds, and by hardening the surface of said coatings after exposure by a glycerine-formaldehyde solution containing the amount of formaldehyde just sufficient to remove the tackiness of the surface so as to insure a proper printing.

These plates have the following advantages: On washing, the residual bichromate, which heretofore has remained in the heavily exposed areas, is readily removed, which eliminates one of the principal causes of continuing hardening and prevents a darkening of the highlights in later impressions. The mechanical strength of the printing surface is substantially enhanced without increasing the hydrophobic nature of the highlights.

My method produces by direct or offset printing long runs of black and white or colored prints of a resolution superior to any other photo-mechanical process and opens the way for the collotype process to compete economically with other printing processes.

The various effects of the dialdehydes and ketoaldehydes and the startling superiority over formaldehyde and other tanning agents is due to the fact that the dialdehydes and ketoaldehydes harden the gelatin only to such a degree that it retains sufficient plasticity and elasticity, and an amount of moisture which makes the coating an ideal substratum for the formaldehyde-hardened printing surface proper. This effect is all the more surprising as it was to be expected that a compound having two aldehyde groups would have double the hardening effect of a mono-aldehyde. I do not intend to limit the invention by unproven theoretical considerations; as a tentative explanation for the unexpected results it might be assumed that one aldehyde group of a dialdehyde reacts with the amino groups of the lysine component of the gelatin so as to cross-link two protein chains while the other aldehyde group remains unreacted and acts in hydrated form as a highly hydrophilic group attracting and retaining moisture and maintaining the desired moisture balance.

Irrespective of any hypothetical explanations, it is certain that the excellent printing properties of the new coating are due to the fact that the intermediate layer between the support and the printing surface proper is sufficintly plasticized so that the colloid coating is resilient and retains a moisture reservoir for the proper balance in printing with greasy inks. Other printing processes such as conventional offset lithography also depend on moisture balance to print with greasy inks but in offset the water fountain on the press continually transfer moisture to the surface of the non-printing areas of the plate—between the dots—while the printing area—the dots or solids—absorbs no moisture and accepts the maximum amount of ink. In continuous tone printing as differentiated from half-tone dot printing the water fountain on the press can not be used because the printing areas is composed of relative amounts of ink receptivity and the intermediate tones would become mottled from contact with the molleton from the water fountain.

By incorporating humectants, plasticizers and other well known hydrophilic agents such as glycerin, sorbitol, polyglycols, and the like, the same kind of desirable coating can not be attained because it is uncontrollable. The reason for this is that small amounts of humectant placed in the coating either have no effect at all or else, when the amount is increased to just the point of effectiveness it interferes with the proper surface hardening with the formaldehyde. The result is excessive contrast in the printing with inferior tonal gradations and a surface with very poor mechanical strength for long press runs. Only dialdehydes and ketoaldehydes solve this problem.

Coatings containing dialdehydes and surface treated with aldehyde as explained in the foregoing are also useful in conventional offset lithography which prints half-tone dots as its image. In this case, an absolute minimum of water need be transferred from water fountain to plate since my coating retains more moisture than conventional coatings for offset. The result will be less water-ink emulsification, better ink drying, better ink receptivity for better solids, and an exceptionally tough, resilient printing surface for long runs.

In addition to the aforementioned advantages, it appears that the dialdehyde reduces the bichromate sensitizer to $CrO_3$ ions which are responsible for the tanning action required on the surface of the plate thereby increasing light sensitivity and reducing the necessary exposure time. In this reduction reaction, the dialdehyde is apparently oxidized to a compound which forms a water soluble complex compound with the chromium compound remaining in the plate, which in this form is easier to remove by washing than the original chrome compound.

Suitable dialdehyde and ketoaldehydes are, for instance, glyoxal, malonaldehyde, succinaldehyde, glutaraldehyde, 2-hydroxy adipaldehyde, pyruvic aldehyde, gamma keto valeraldehyde and the like. Also aromatic dialdehydes and ketoaldehydes, for instance the phthalic aldehydes, phenylmalonic dialdehyde, formylhydroxycinnamaldehyde, diphenyl dialdehyde, phenyl glyoxal, and the acetals and semiacetals of all these compounds can be used, if they are, at least to a certain extent, soluble in water. The compounds must be used in amounts of about 0.045 to 0.15 millimole per 1 g. of the gelatin and not exceed the stoichiometric amount corresponding to the amino groups of the gelatin; the gelatin must have a pH of about 3 to 6, preferably about 4.0 to 5.5.

Suitable supports for the gelatin emulsion are, for instance, plates of aluminum, Monel, zinc, or synthetic resins such as cellulose acetate, polyvinyl chloride, ethylene terephthalate and the like, calendered or laminated alone or in combination with reinforcing glass or synthetic textile fibres. It is a further important advantage of the invention that it eliminates the conventional expensive graining operation and allows of using ungrained aluminum plates.

In the following, some figures and examples will be presented for illustrating the invention more in detail. The examples are not meant to limit the scope of the invention and its possible variations and applications.

In the drawings:

FIG. 1 is an enlarged fragmentary cross-sectional view illustrating a step in the method of the invention;

FIG. 2 is a similar view illustrating a subsequent step in the method;

FIG. 3 is an enlarged fragmentary cross-sectional view of an inked printing plate according to the invention, and FIG. 4 is a similar view showing a printing plate with hardened printing surface.

In the drawings, the reference numeral 1 designates a suitable support, for instance an ungrained aluminum plate. 2 is the bichromated gelatin layer containing the dialdehyde, which layer has normally a height of about $1/1000$ inch. On exposure, these areas that received maximum exposure are tanned as shown at 3. After exposure, the bichromate is washed out, leaving the gelatin-dialdehyde layer free of bichromate as shown at 2'. After the bichromate wash-out, the gelatin layer in the least tanned areas has swollen to a thickness of about $3/1000$ inch. FIG. 4 shows a plate where the surface has been hardened with formaldehyde; the characteristic feature of this plate is the elastic gelatin-dialdehyde layer 2' between the support 1 and the formaldehyde hardened surface 5. Such plate combines the hard and resistant surface layer desired for printing with the resilient gelatin-dialdehyde ground layer attaching the printing surface to the support. The ground layer contains its water content and remains elastic because the formaldehyde hardened surface acts as a kind of blocking layer against the loss of water from the ground layer. On the other hand, the dialdehyde in the ground layer prevents substantially the formaldehyde of the surface layer to diffuse inwardly and to effect the elastic properties of the ground layer.

My attempts to replace the gelatin in the collotype process by other proteins, colloids, and synthetic resins have brought about some extension of the useful life of such plates. For instance, by substituting an equal quantity by weight of a copolymer of methyl vinyl ether and maleic anhydride, known as PVM/MA, for the gelatin in the coating a very resistant surface was produced which had the necessary characteristics for printing. Polyvinyl alcohol of the proper grade was also substituted for the gelatin and the resulting plates were superior in light sensitivity yielding much lower exposure times. Combination of PVM/MA and polyvinyl alcohol with equal parts by weight of gelatin also gave useable results. Sensitizing alcohol-water soluble nylon, sold commercially as T 8 DV 55 by Du Pont, with bichromate and treating the emulsion and the resulting coating in the manner described for gelatin gave an extremely tough printing surface as its only advantage.

Other colloids such as polyacrylamide were also used successfully both alone and in combination with gelatin but none were superior to gelatin in all respects consistent with the highest quality printing.

*Example 1*

100 grams of a suitable gelatin were dissolved in 1000 cc. of water at a temperature of about 110° F. 30 grams of ammonium bichromate and 20 grams of potassium bichromate were dissolved in 50 cc. of warm water and the bichomate solution was added to the gelatin solution whereby the pH dropped from 5.2 to 5.0. Finally, 15 cc.

of a 5% glyoxal solution in water (corresponding to 0.052 millimole per gram gelatin) were added and thoroughly mixed with the bichromated gelatin solution.

This coating solution was poured on the revolving aluminum plate in the whirler and the coated plate was whirled until dry. The coated light sensitive plate was then exposed with an arc lamp in the vacuum frame under a continuous tone negative for the time required by the density of the negative. The plate was then dipped in cold water for 20 minutes to wash out the bichromate sensitizer, and dried. The obtained image was completely colorless although it was visible when viewed by light at an angle. Before using the plate for printing, it was soaked for about 20 minutes with a 50% solution of glycerin and water, surface dried, clamped in the press. The plate was re-moistened with glycerin-formaldehyde solution (3 parts of glycerin to 1 part of formaldehyde) until the tackiness in the highlights or non-printing areas disappeared. This takes normally about 4 to 5 minutes but may be extended to ten minutes.

The plate was dried off and the press was run with a speed of 5,000 prints per hour for 2¼ hours and produced over 10,000 prints of excellent quality. The press was then stopped, the plate again soaked with dampening solution (50% glycerin) for about 10 minutes, and the printing was resumed, whereupon another edition of 10,000 prints showing the original contrast and resolution was obtained. This procedure could be repeated several times, depending on the length of run desired.

In comparative test runs, plates were prepared and treated in exactly the same way with the only difference that in one series no glyoxal solution was added, and in another series the 5% glyoxal solution was replaced by the equivalent amount of 5% formaldehyde solution. In the tests without glyoxal, the plate began after about 2,000 sheets to show wear marks, i.e. the surface of the gelatin in the non-printing areas became rough as if rubbed with sandpaper and began to accept ink in patches. In other words, only 2,000 impressions were the upper limit of the printing capacity from this plate.

In the tests where formaldehyde was used instead of glyoxal there was, after about 2,000 prints a definite loss in image quality. The plate became increasingly harder and the middle tones turned darker and darker until they almost approached the shadows. For instance, if a negative with a density range of 0.85 represented by a shadow density of 0.30 and a highlight density of 1.15 was used, the shadow densities from 0.30 to 0.50 had the tendency to print as one density in the press so that the tonal differences disappeared. As a result, the prints could not be maintained at the proper contrast after the printing of about 5,000 impressions, though no physical breakdown of the plates took place.

Attempts to overcome the shortcomings of the formaldehyde hardening by increasing or decreasing the formaldehyde content of the gelatin emulsion had no success for the following reasons:

On increasing the hardening content, the shadows become overhard and the light tanning in these areas makes it almost impossible to remove the bichromate sensitizer after exposure. At the same time, the drying temperature of the plate in the whirler assumes a critical influence on the relative hardness of the plate as the formaldehyde gelatin system is extremely sensitive in this respect.

If the formaldehyde content of the gelatin emulsion was reduced, the conditions became similar to those of pure gelatin. The plates were either so tacky as to produce sticking of the paper to the plate, or when surface hardened required too long hardening items, became brittle so as to prevent any length of runs.

The presence of glyoxal, or any other of the recited dialdehydes or ketoaldehydes, in the gelatin emulsion seems to protect the gelatin layer below the surface against any harmful influence of the formaldehyde used for surface hardening. The combination of a dialdehyde or ketoaldehyde in the gelatin with surface hardening by means of formaldehyde ensures that the gelatin layer connecting the printing surface with the support, and the printing surface proper retain their optimum properties, i.e., elasticity of the layer and hardness and the desired inking reception and contrasts of the surface.

The surface hardening with formaldehyde is carried out for a time sufficient to harden a surface layer which may comprise about 10 to 25 percent of the total height of the emulsion. In other words, in the finished printing plate, the emulsion should consist of a dialdehyde treated elastic gelatin layer and monoaldehyde hardened surface layer, where the relative thickness of these layers should be within the range of about 75:25 to 90:10.

When a normal gelatin surface is hardened with formaldehyde, the action of the formaldehyde continues inwardly of the emulsion even subsequent to the formaldehyde treatment proper, and the whole emulsion is gradually hardened and becomes brittle. In my method, where the formaldehyde is reacted with the surface of a gelatin previously treated with glyoxal or a similar compound, the hardening action of the formaldehyde remains limited to the surface, and no harmful after-hardening of the elastic substratum takes place.

*Example 2*

100 grams of gelatin were dissolved in 900 cc. of water at 110–120° F. To this solution were added 25 cc. of a 5% aqueous solution of 2-hydroxyadipaldehyde (=about 0.1 millimole per gram gelatin). The pH of the solution was 4.7 at 110° F. Four aluminum plates were coated with this solution in the whirler and dried. The plates so prepared were stored at 70° F. at 50–60% relative humidity for one week. The plates were then sensitized by immersion in a 3% potassium bichromate and 2% ammonium bichromate solution for 5 minutes and dried.

A set of four color separation negatives had been prepared having density ranges of 0.30–1.25. Each negative was exposed on one of the previously prepared plates, plate washed to remove bichromate, and dried. The plate which contained the magenta image was soaked in 50% glycerin solution, surface dried, and locked in the offset press from which the water fountain had been removed. The plate was then sponged with a surface hardening solution containing 3 parts of glycerin to 1 part of formaldehyde for 10 minutes, dried and printing was begun.

The plates containing the yellow, cyan, and black images were treated identically to the magenta plate as described above and each was printed in its proper color and gradation in register. The result was a four color reproduction obtained at high press speeds (5,000 impressions per hour) in continuous-tone by the offset principle (rubber blanket image transfer) without loss of quality and with resolution of detail superior to any other photo-mechanical printing process.

As illustrated by this example, my process makes it possible to prepare precoated unsensitized printing plates which can be stored and shipped without deterioration of the desired properties of the gelatin and need be sensitized with bichromate only immediately before they are to be exposed. My coating and the process for making the coating applicable to the printing surface is not limited to the kind of sensitizer used such as diazo compounds which can be incorporated in the emulsion or can be applied after the coating is put on a support.

The foregoing detailed description has been given for clearness of understanding only and no unnecessary limitations are to be understood therefrom. Whenever reference is had to a specific dialdehyde, it is to be understood that other dialdehydes or ketoaldehydes, or their acetals or semiacetals can be substituted therefor. The invention is not limited to the exact details and concentrations shown and described, and obvious modifications will occur to those skilled in the art. For instance, the printing surface can also be subjected, in addition, to the well-known treatment with ammonia or other bases to reduce the tackiness and subsequent surface hardening with a tanning agent.

This application is a continuation-in-part of my application Serial No. 428,423, filed May 10, 1954, for "Collotype Printing Plate and Process."

I claim:
1. In a process for producing a printing plate for use in a collotype process, the steps of coating a plate with a layer of a bichromated light-sensitive gelatin emulsion, said emulsion having a pH between about 3 to 6 and containing evenly distributed therein a water soluble aldehyde selected from the group consisting of dialdehydes and ketoaldehydes in an amount of about 0.045 to 0.15 millimole per gram of gelatin, then exposing said emulsion to the action of light passing through a negative, washing the plate to remove substantially the bichromate, and treating the surface of the exposed emulsion with formaldehyde in an amount and for a time just sufficient to remove the tackiness of said surface.

2. In a process for producing a printing plate for use in a collotype process, the steps of coating a suitable plate with a layer of a bichromated light-sensitive gelatin emulsion, said emulsion having a pH of about 3 to 6 and containing evenly distributed therein glyoxal in an amount of about 0.0026 g. to 0.0087 g. per gram of gelatin, exposing said emulsion to the action of light passing through a negative, washing the plate to remove substantially the bichromate, and treating the surface of the exposed emulsion with formaldehyde in an amount and for a time just sufficient to remove the tackiness of said surface.

3. In a process for producing a printing plate for use in a collotype process, the steps of coating a suitable plate with a layer of a bichromated light-sensitive gelatin emulsion, said emulsion having a pH of about 3 to 6 and containing evenly distributed therein 2-hydroxyadipaldehyde in an amount of about 0.045 to 0.15 millimole per gram of gelatin, exposing said emulsion to the action of light passing through a negative, washing the plate to remove substantially the bichromate, and treating the surface of the exposed emulsion with formaldehyde in an amount and for a time just sufficient to remove the tackiness of said surface.

4. A collotype printing plate comprising a support having on one side thereof a gelatin layer containing a water soluble aldehyde selected from the group consisting of dialdehydes and ketoaldehydes in an amount of about 0.045 to 0.15 millimole per gram of gelatin, said layer containing a hardened gelatin image, the lower zone of the layer being substantially free of formaldehyde, and the upper zone of said layer being substantially tackfree and hardened with formaldehyde, the relative thickness of said lower zone to said upper zone being about 75:25 to 90:10.

5. A collotype printing plate comprising a support having on one side thereof a gelatin layer containing glyoxal in an amount of about 0.0026 g. to 0.0087 gram per gram of gelatin, said layer containing a hardened gelatin image, the lower zone of the layer being substantially free of formaldehyde, and the upper zone of said layer being substantially tackfree and hardened with formaldehyde, the relative thickness of said lower zone to said upper zone being about 75:25 to 90:10.

6. A collotype printing plate comprising a support having on one side thereof a colloid layer impregnated with a humectant selected from the group consisting of glycerine, sorbitol, and polyglycols, and containing a water soluble aldehyde selected from the group consisting of dialdehydes and ketoaldehydes in an amount of about 0.045 to 0.15 millimole per gram of said colloid, said colloid layer containing a hardened image, the lower zone of the layer being substantially free of formaldehyde, and the upper zone of the layer being substantially tackfree and hardened with formaldehyde, the relative thickness of said upper zone to the lower zone being about 10:90 to 25:75, said colloid being selected from the group consisting of gelatin, methyl vinyl ether-maleic anhydride copolymer, polyvinyl alcohol, polyacrylamide, alcohol-water soluble nylon, and mixtures thereof.

References Cited in the file of this patent

UNITED STATES PATENTS

| | | |
|---|---|---|
| 1,453,259 | John | Apr. 24, 1923 |
| 1,634,658 | Flammer et al. | July 5, 1927 |
| 1,634,659 | Flammer et al. | July 5, 1927 |
| 2,154,895 | Fricke et al. | Apr. 18, 1939 |
| 2,180,335 | Brunken | Nov. 21, 1939 |
| 2,414,858 | Davidson | Jan. 28, 1947 |
| 2,493,838 | Terry | Jan. 10, 1950 |
| 2,494,055 | Orkin | Jan. 10, 1950 |
| 2,593,912 | Orinik | Apr. 22, 1952 |
| 2,642,362 | Clark et al. | June 16, 1953 |
| 2,663,639 | Wood et al. | Dec. 22, 1953 |

FOREIGN PATENTS

| | | |
|---|---|---|
| 4,361 of 1907 | Great Britain | Feb. 21, 1908 |
| 504,378 | Great Britain | Apr. 24, 1939 |

OTHER REFERENCES

Mees: Theory of the Photographic Process, Macmillan Co. Pub., New York, 1942, page 69.